(12) United States Patent
Frachon

(10) Patent No.: US 8,373,410 B2
(45) Date of Patent: Feb. 12, 2013

(54) ROTARY OR LINEAR POSITION SENSOR HAVING A VARIABLE MAGNET PROFILE

(75) Inventor: Didier Frachon, Besançon (FR)

(73) Assignee: Moving Magnet Technologies, Besancon (FR)

( * ) Notice: Subject to any disclaimer, the term of this patent is extended or adjusted under 35 U.S.C. 154(b) by 576 days.

(21) Appl. No.: 12/516,107

(22) PCT Filed: Nov. 26, 2007

(86) PCT No.: PCT/FR2007/001937
§ 371 (c)(1),
(2), (4) Date: May 28, 2009

(87) PCT Pub. No.: WO2008/071875
PCT Pub. Date: Jun. 19, 2008

(65) Prior Publication Data
US 2010/0045275 A1 Feb. 25, 2010

(30) Foreign Application Priority Data
Nov. 28, 2006 (FR) ...................................... 06 55142

(51) Int. Cl.
*G01B 7/30* (2006.01)
*G01B 7/14* (2006.01)
(52) U.S. Cl. .......... 324/207.25; 324/207.24; 324/207.21
(58) Field of Classification Search ... 324/207.2–207.25
See application file for complete search history.

(56) References Cited

U.S. PATENT DOCUMENTS

| | | | | |
|---|---|---|---|---|
| 5,757,179 | A | * | 5/1998 | McCurley et al. .......... 324/207.2 |
| 5,955,881 | A | * | 9/1999 | White et al. ................ 324/207.2 |
| 6,188,216 | B1 | * | 2/2001 | Fromer ....................... 324/207.2 |
| 6,396,259 | B1 | * | 5/2002 | Washeleski et al. ..... 324/207.22 |
| 6,433,536 | B1 | | 8/2002 | Yundt et al. |
| 6,653,830 | B2 | * | 11/2003 | Luetzow ................... 324/207.21 |
| 6,992,478 | B2 | * | 1/2006 | Etherington et al. ....... 324/207.2 |
| 7,135,857 | B2 | * | 11/2006 | Johnson ..................... 324/207.2 |
| 2002/0089327 | A1 | | 7/2002 | Spellman |
| 2004/0017187 | A1 | | 1/2004 | Van Ostrand et al. |

FOREIGN PATENT DOCUMENTS

| WO | WO 01/55668 A | 8/2001 |
|---|---|---|
| WO | WO 2005/078395 A | 8/2005 |

\* cited by examiner

*Primary Examiner* — Jay Patidar
(74) *Attorney, Agent, or Firm* — Arent Fox LLP

(57) ABSTRACT

The invention relates to a magnetic angular or linear sensor including at least one permanent magnet defined in a cylindrical (r, Q & z) or Cartesian (x, y & z) coordinate system and at least two magneto-sensitive elements, in which the magnet can move in relation to said two magneto-sensitive elements. The invention is characterized in that at least one dimension of the magnet varies as a non-constant function and in that the magnetization of the magnets is oriented in a single direction, i.e. x, y or z in the case of a magnet defined in a Cartesian coordinate system or r, Q or z in the case of a magnet defined in a cylindrical coordinate system.

19 Claims, 16 Drawing Sheets

ROTARY OR LINEAR POSITION SENSOR HAVING A VARIABLE MAGNET PROFILE

CROSS-REFERENCE TO RELATED APPLICATION

This application is a National Stage entry of International Application No. PCT/FR2007/001937, filed Nov. 26, 2007, which claims priority to French Application No 06/55142 filed Nov. 28, 2006, the entire specification claims and drawings of which are incorporated herewith by reference.

The present invention relates to the field of magnetic linear or rotary position sensors including at least one permanent magnet and at least two elements for measuring the magnetic field, which measure two different components at the same spot or two magneto-sensitive elements measuring the same component of the field at two distinct spots.

The present invention provides the utilization of a permanent magnet having at least one dimension varying as a non constant, preferably continuous, function and in a quasi sinusoidal way (thickness, width). The magnetization of the permanent magnet can be along one of the dimensions thereof.

The magnetic linear or angular position sensors have several advantages:
no mechanical contact with the movable part and thus no wear,
insensitivity to dust,
reduced production costs,
extended service life.

Most contactless magnetic position sensors use permanent magnets associated with a magnetic circuit which is more or less complex and made of a ferromagnetic material used for guiding and/or focusing the magnetic flux generated by the permanent magnet or magnets, but this is at the expense of the costs and performances of the position sensor. For example, such ferromagnetic materials induce phenomenon of magnetic hysteresis in the position sensor which can be reduced but when using costly material.

In addition, these sensors measure a physical unit which is proportional to the flux generated by the magnet or magnets, and this flux is thus affected by effects caused by temperature and time (ageing of the magnetic properties of the permanent magnet) on the magnetic properties of the permanent magnets. Such position sensors must thus integrate an electronic compensation for limiting the effects of temperature. This compensation is not perfect and thus induces a deterioration of the performances of the magnetic position sensors based on such a principle.

From the state of the art, the U.S. Pat. No. 6,433,536 which does not describe the characteristic relating to the implementation of a magnet having a single magnetization direction is known. On the contrary, FIGS. 1A, 2, 3A and 3B show that the magnets are of the multipolar type with alternating magnetic north-south and south-north poles. This document thus does not teach the persons skilled in the art a solution according to which the magnetization direction is unique, but on the contrary discards it from such a solution.

In addition, FIGS. 1 and 2 show magnets having a break of slope and thus a slope which varies in a discontinuous and not in a continuous way. This second claimed characteristic is thus not taught either by U.S. Pat. No. 6,433,536, since this document directs the person skilled in the art away from a type of magnet having a continuous variation in the profile.

The solution mentioned in the application for the American patent US 2002/089327 also implements a magnet having a bipolar magnetization. In addition, the patent describes an optimization performed on the transition of the magnet used. By nature, a transition separates the north and south poles of the magnet. These two poles are represented in FIG. 7 and nothing in the description provides a solution wherein the magnet is magnetized in a single direction.

In addition, the document US 2002/089327 does not disclose the characteristic relating to the variation of the magnet profile; in all the examples cited, the magnet has a constant section.

The application for the American patent US 2004/017187 does not disclose more than the two other prior documents the characteristics according to which the magnets have a continuously varying profile. It provides solution in which the magnets have either a constant profile or several polarities. It does not disclose more than the other documents the claimed characteristics which are essential for obtaining the expected technical effect.

The present invention provides to remedy the whole or a part of the above-mentioned problems by providing an angular or linear position magnet including at least one permanent magnet defined in a cylindrical (r, Q & z) or Cartesian (x, y & z) coordinates system and at least two magneto-sensitive elements, in which the magnet can move in relation to said two magneto-sensitive elements, characterised in that at least one dimension of the magnet varies as a non constant function and in that the magnetization of the magnet is oriented in a single direction x, y or z in the case of a magnet defined in a Cartesian coordinate system or r, Q or z in the case of a magnet defined in a cylindrical coordinates system.

Preferably, said dimension varies as a non constant and continuous law, as a non constant and periodical law, advantageously as a sinusoidal function.

The magneto-sensitive elements measure two components of the magnetic field substantially at the same spot.

The calculation of the position is made by calculating the ratio of two components of the magnetic field or by calculating an arctangent.

The magnetization direction of the permanent magnet can be chosen along any one of the dimensions thereof, as a function of the components of the magnetic field selected for calculating the linear or angular position.

Preferably, for a linear variant of the position sensor, the magnet is composed of a magnet with a length (according to the motion direction), close to the travel to be measured and with a thickness varying as a substantially sinusoidal function. The magnet is magnetized in a direction which is substantially perpendicular to the motion direction and preferably along the thickness. The magnet generates a magnetic field, the longitudinal (X) component and the transversal (Z) component of which are measured on a rectilinear segment close to the magnet, and thus vary respectively substantially as a portion of a sine function and substantially as a portion of a cosine function. Using one of the two following formulas, it is possible to deduce the linear or angular position of the permanent magnet:

$$x = \arctan\left(\frac{Bx}{Bz}\right) \text{ or } \theta = \arctan\left(\frac{Bt}{Bz}\right)$$

in which:
x=the linear position of the magnet
θ=the angular position of the magnet
Bx and Bt=the tangential component of the magnetic field
Bz=the normal component of the magnetic field.

It is also possible to use a simpler formula which corresponds to the first term of the limited development of the preceding equation:

$$x = \frac{Bx}{Bz} \text{ or } \theta = \frac{Bt}{Bz}$$

As a matter of fact, the transversal component Bz has a small variation along the travel of the position sensor for the linear or rotary position sensors having a travel <300°, and thus the above-mentioned formula is a rather good approximation.

The calculation of the amplitude ratio followed or not by the calculation of the arctangent function is performed either by a separate element or directly by a component of the ASIC type (for example: MELEXIS 90316) integrating the measurement of two components of the magnetic field and the calculation of the arctangent of the ratio of the two components of the magnetic field or simply the calculation of the ratio of the two components of the magnetic field.

More generally, for adjusting the linearity of the output signal, it is also possible to apply a multiplying factor α to the ratio of the two components of the magnetic flux density prior to calculating the arctangent of the same ratio. The function making it possible to calculate the position is then given by:

$$x = \arctan\left(\alpha \frac{Bx}{Bz}\right) \text{ or } \theta = \arctan\left(\alpha \frac{Bt}{Bz}\right)$$

The practical embodiment of this position sensor can be made with the probe moving along the axis X for a linear position sensor, in front of a stationary magnet, or with a mobile magnet and a stationary probe, with the first solution needing less room for example and the second solution allowing an easier assembling because of the stationary connections.

The present invention offers several advantages with respect of the existing solutions:
  because the linear or angular positions are calculated using an amplitude ratio, it is possible to omit the variations in the magnetic properties of the magnet in temperature and over time;
  for linear and rotary position sensors, a magnet having a length close to the useful travel to be measured is used; magnetization of the magnet in a single direction.

The advantage of the present invention is first that the obtained travel mainly depends on the dimensions of the magnet, and in that the measure does not depend on the remanent flux density of the magnet and thus not on the evolution thereof as a function of temperature, which avoids compensating such variation in temperature.

The economical advantage of the structure results from the fact that the position sensor is minimized by using a permanent magnet magnetized in a single direction (for a linear position sensor: along the thickness, the width or the length and according to the thickness, radially or tangentially for a rotary position sensor) and a probe capable of measuring two components of the magnetic field preferably at the same spot. As the processing of the measured signal corresponds to the calculation of an angle (calculation of an arctangent) or the simple ratio of two components of the magnetic field, it is possible to use probes which are normally used for angular or linear position sensors (for example: MLX90316 produced by Melexis), with all the corrections of non linearity used in these position sensors, if any.

It is also possible to use probes based on magneto-resistances capable of measuring the magnetic flux density angle in the plane of the magneto-sensitive element. Such probes do not directly integrate the calculation of the ratio of the components and/or the calculation of the arctangent. This calculation must thus be made through an internal component.

For manufacturing reasons, the magnet can be mounted on a ferromagnetic yoke; this makes it possible to reinforce the mechanical resistance of the magnet. As regards the magnetization, the modification in the components of the magnetic field through the utilization of a ferromagnetic yoke depends on the direction in which the magnet is magnetized. The amplitude of the components can be increased or reduced according to the direction in which the magnet is magnetized.

The shape of the magnet is compatible with the methods of embodiment used for manufacturing permanent magnets. Ferrite, NbFeB or SmCo based magnets for example can be used with various manufacturing methods such as injection, pressing or sintering.

In another embodiment, two magneto-sensitive probes can be used, which measure the same component of the magnetic field for the same position, using the symmetry of the magnet. This can be useful for cancelling or reducing the influence of an external magnetic field.

More generally, at least one of the dimensions of the permanent magnet can vary as any function for adapting the output signal of the position sensor to a predefined function which does not compulsorily have a linear variation.

The invention will be better understood when reading the description and the following Figures.

Figure 1:
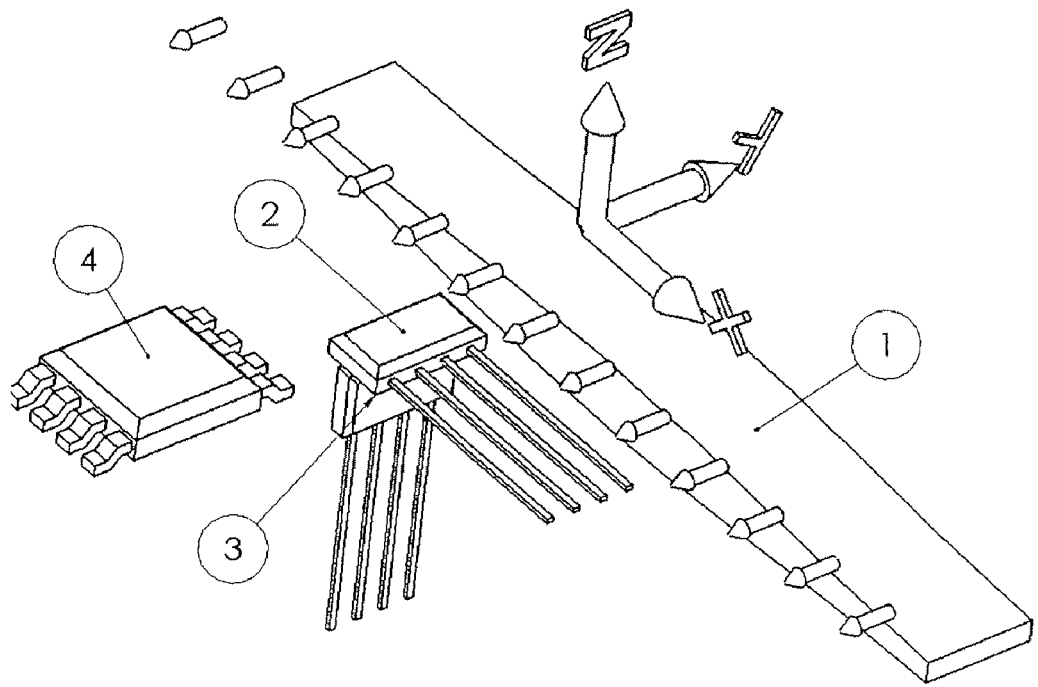
FIG. 1 shows a rectilinear magnet with a quasi sinusoidally variable thickness substantially magnetized along the width for a linear position sensor according to the present invention.
Figure 2:
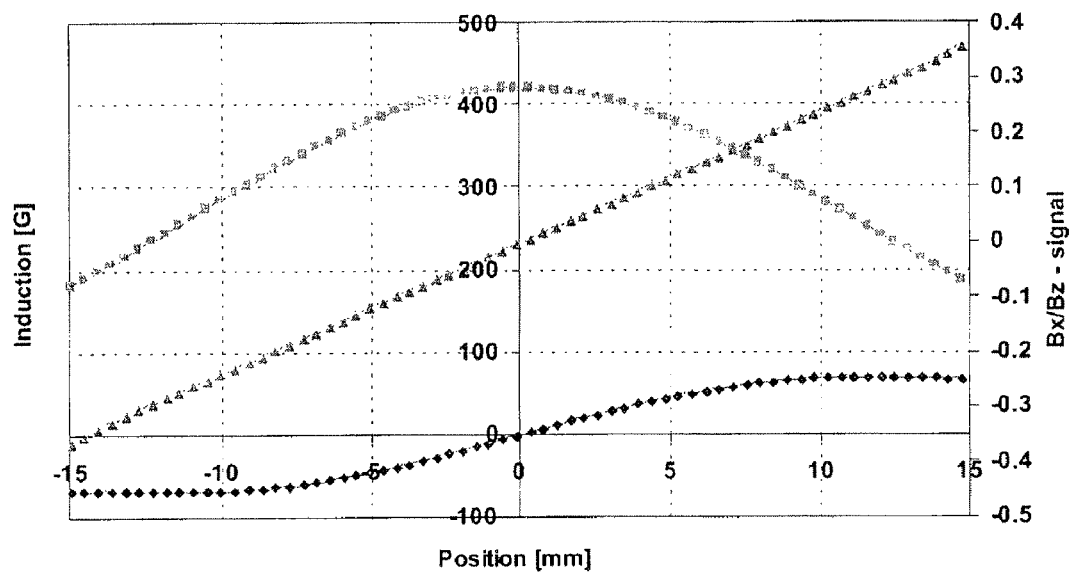
FIG. 2 shows the components x and z of the magnetic flux density at a spot x, y or z located on the same side of the magnet as a function of the position x of the magnet shown in FIG. 1.

FIG. 1 shows a magnet 1 having been magnetized in a direction substantially oriented along the width of the magnet and the thickness of which substantially varies as a sine function. The measuring of the magnetic field close to the magnet is performed by one or several magneto-sensitive elements 2 and 3. As can be seen in FIG. 2, the magnetic flux density components x and z measured by two magneto-sensitive elements 2 and 3 on a rectilinear segment shifted with respect to the center of the magnet along y, respectively follow substantially a sine function and a cosine function, the calculation of the arctangent of Bx/Bz or Bx/Bz made by 4 gives a linear signal and provides information which is proportional to the position of the magnet with respect to the probe.

Figure 3:
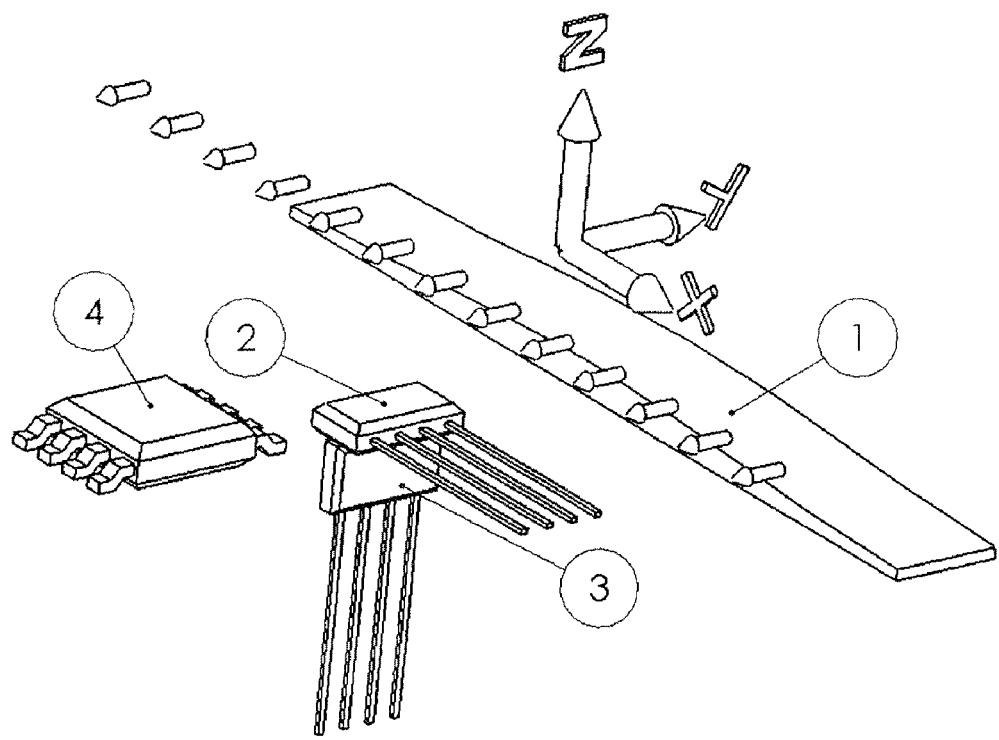
FIG. 3 shows a rectilinear magnet with a quasi sinusoidally variable thickness having a plane face, and magnetized substantially along the width for a linear position sensor according to the present invention.

FIG. 3 shows a magnet 1 having been magnetized in a direction which is substantially oriented along the width of the magnet and the thickness of which substantially varies as a sine function with respect to a plane face.

Figure 4:
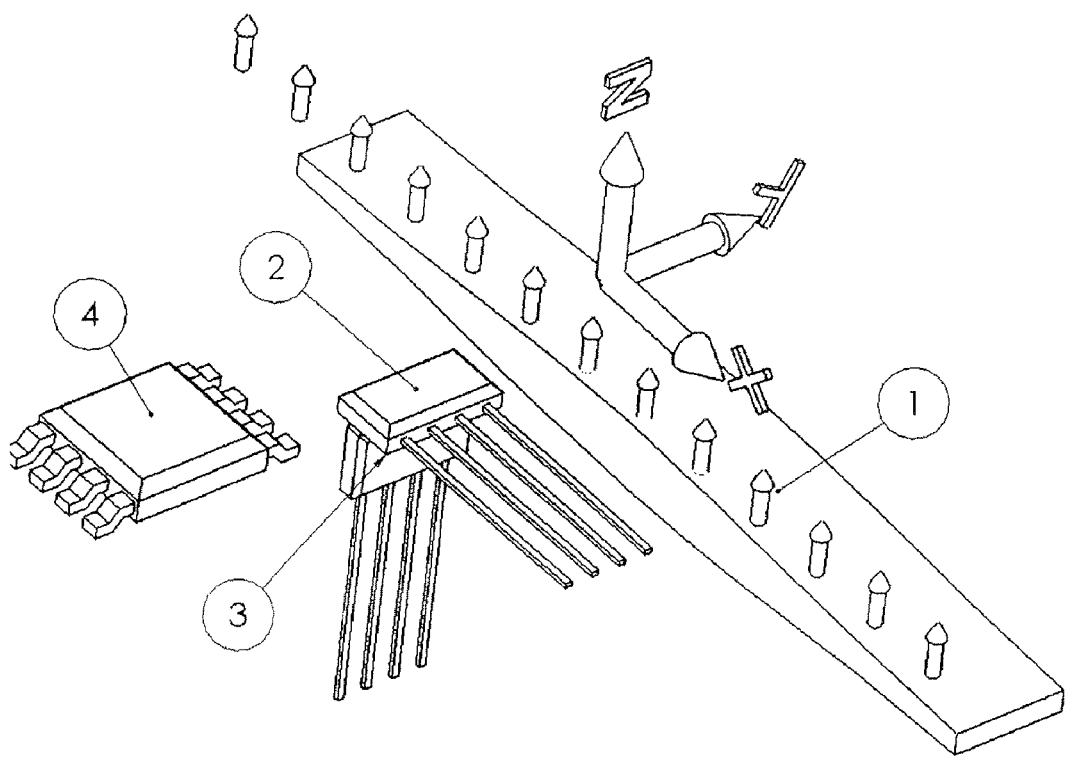
FIG. 4 shows a rectilinear magnet having a quasi sinusoidally variable thickness and substantially magnetized along the thickness for a linear position sensor according to the present invention.
Figure 5:
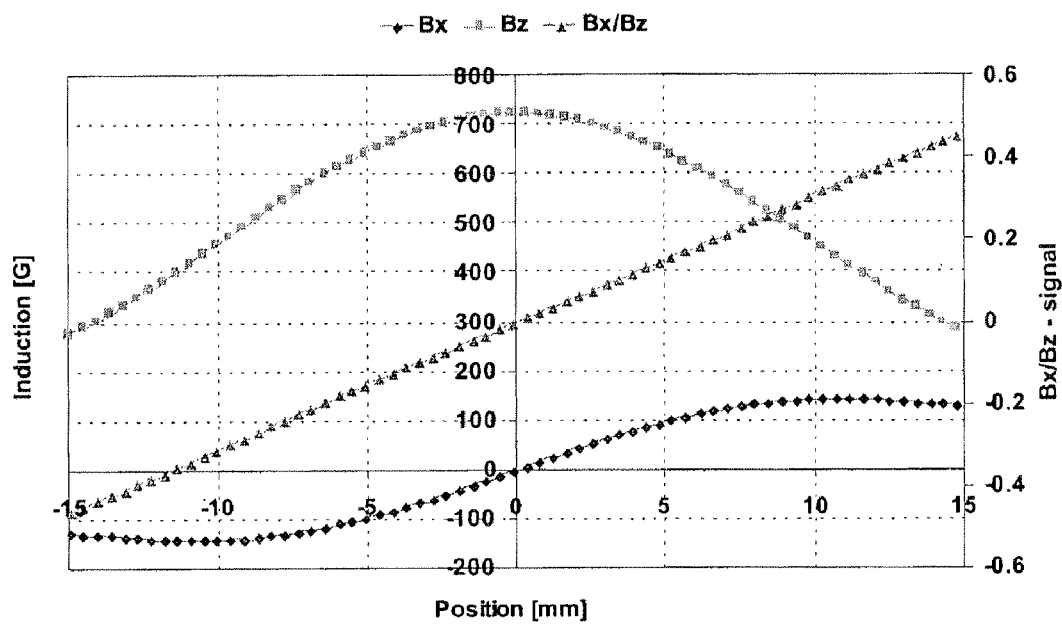
FIG. 5 shows the components x and z of the magnetic flux density at a spot x, y and z located above the magnet, as a function of the position x of the magnet shown in FIG. 4.

FIG. 4 shows a magnet 1 having been magnetized in a direction substantially oriented along the thickness of the magnet, the thickness of which varies quasi sinusoidally. The measuring of the magnetic field close to the magnet is performed by two magneto-sensitive elements 2 and 3. As can be seen in FIG. 5, the components of the magnetic flux density x and z on a rectilinear segment above the magnet respectively follow substantially a sine function and a cosine function, with the calculation of the arctangent of Bx/Bz or Bx/Bz being performed by 4 and giving a linear signal and giving information on the position of the magnet with respect to the probe.

Figure 6:
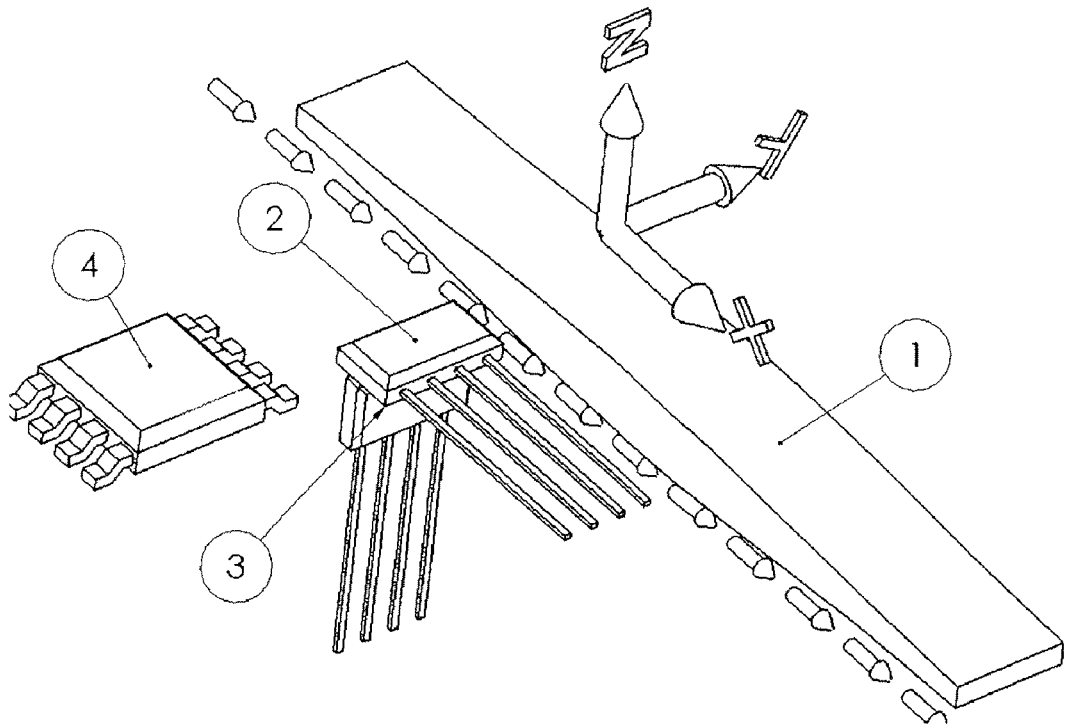
FIG. 6 shows a rectilinear magnet with a quasi sinusoidally variable thickness substantially magnetized along its length for a linear position sensor according to the present invention.
Figure 7:
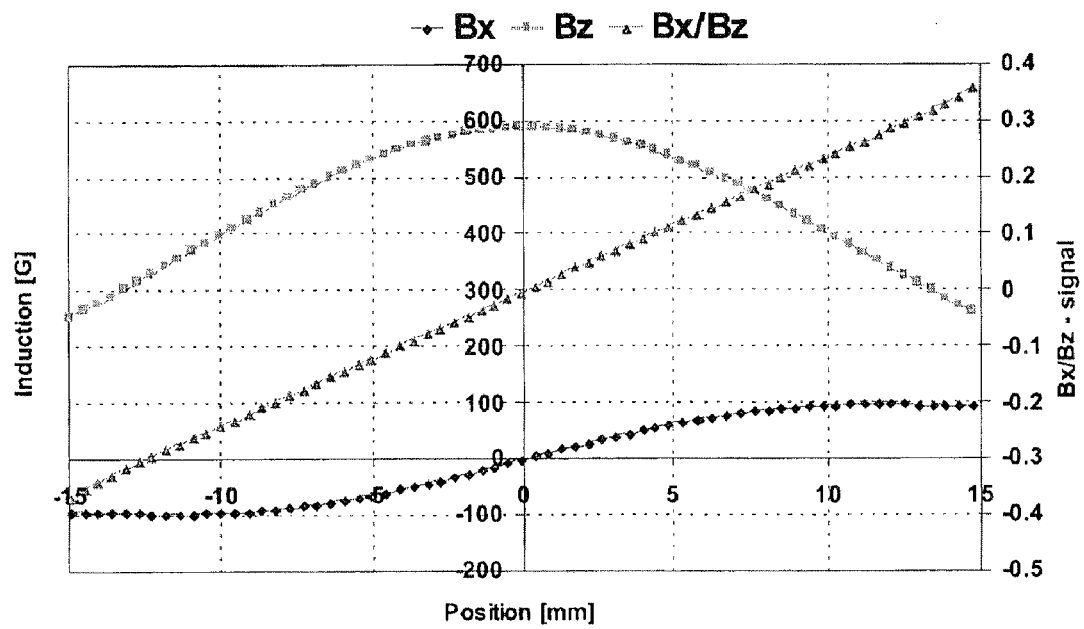
FIG. 7 shows the components x and z of the magnetic flux density at a spot x, y and z located above the magnet, as a function of the position x of the magnet shown in FIG. 6.

FIG. 6 shows a magnet 1 having a magnetization in a direction which is substantially oriented along the length of the magnet, the thickness of which varies substantially sinusoidally. The measurement of the magnetic field close to the magnet is performed by magneto-sensitive elements 2 and 3. As can be seen in FIG. 7, the components of the magnetic flux density x and y on a rectilinear segment close to the magnet respectively follow substantially a sine function and a cosine function, the calculation of the arctangent of Bx/Bz or Bx/By being made by 4 and giving a linear signal and information on the position of the magnet with respect to the probe.

Figure 8:
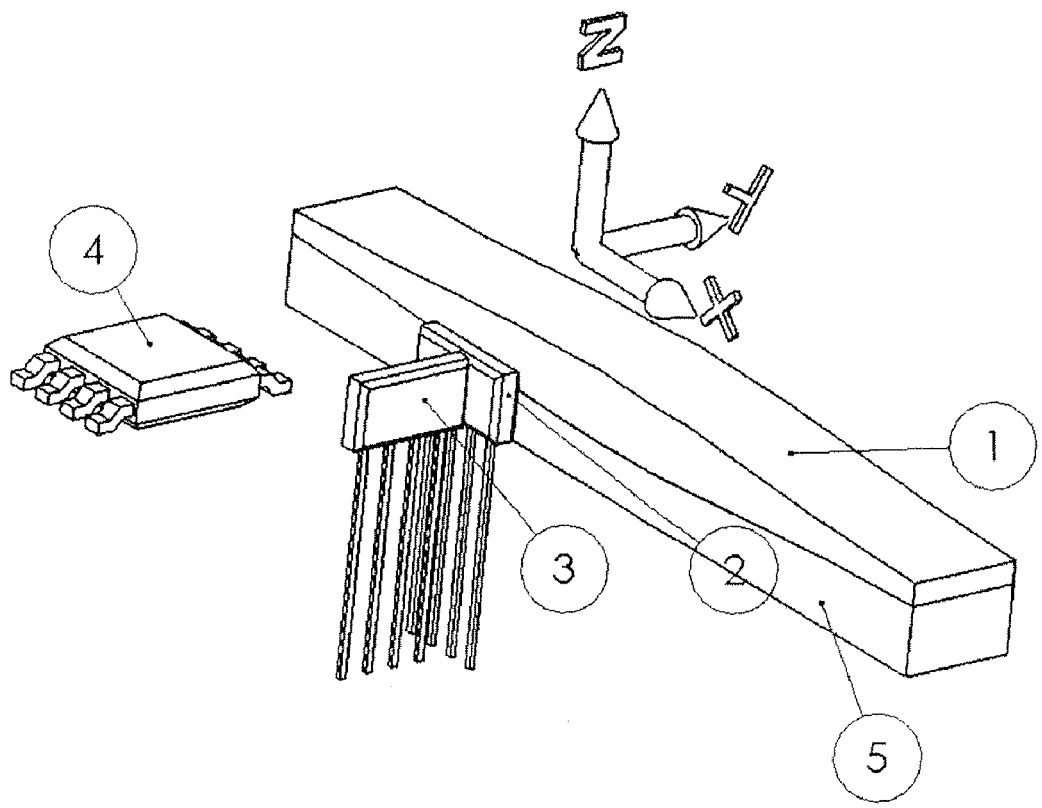
FIG. 8 shows a rectilinear magnet with a thickness substantially varying as a sinusoidal function and mounted on a ferromagnetic yoke.

FIG. 8 shows a rectilinear magnet 1 with a thickness varying substantially as a sinusoidal function and mounted on a ferromagnetic yoke 5 making it possible to improve the mechanical properties of the position sensor. The magnet can also be embedded in this ferromagnetic yoke. The modifications induced on the components of the magnetic field depend on the components and on the direction of the magnetization of the magnet. The amplitude of the components of the magnetic field can be increased or reduced as a function of the magnetization direction.

Figure 9:
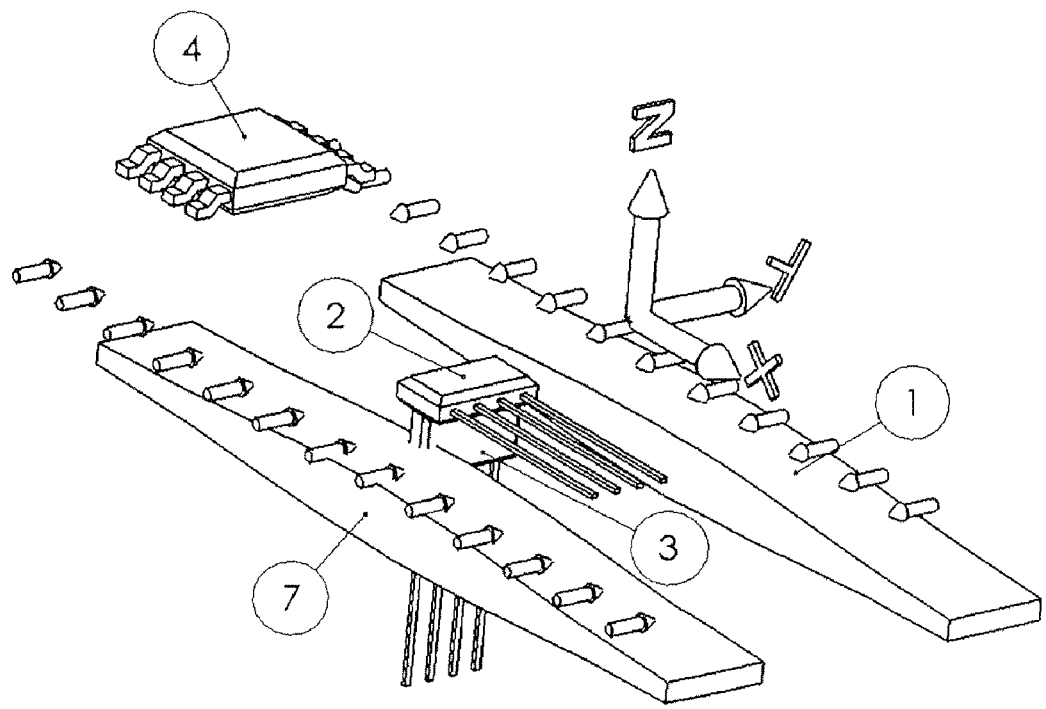
FIG. 9 shows two rectilinear magnets with a quasi sinusoidally variable thickness substantially magnetized according to the width in the opposite direction for a linear position sensor according to the present invention.

FIG. 9 shows a linear sensor having two magnets magnetized 1 and 7 along the width and in opposite directions. Such an arrangement makes it possible not to take into consideration the influence induced by a shifting of the measuring spot over the life of the position sensor. As a matter of fact, the measuring spot is located between both magnets. In the case of the structure in FIG. 1, if the position of the measuring spot varies over time in direction y, a slight error of linearity will appear, and a symmetric structure makes it possible to avoid this influence. Similar configurations can be found for magnetizations in the directions x and z.

Figure 10:
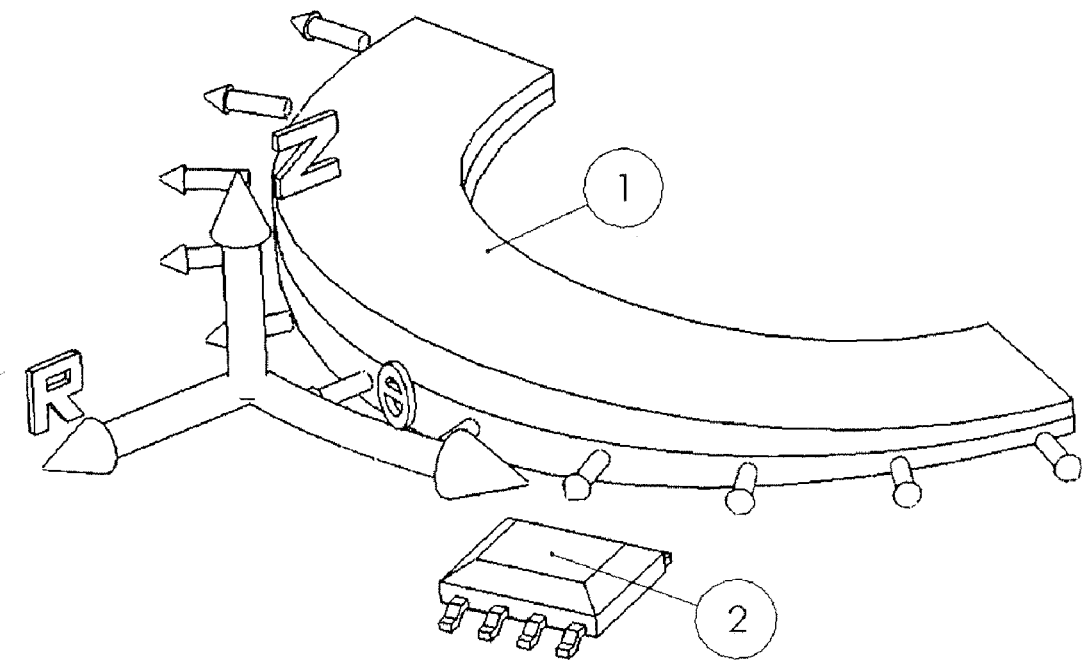
FIG. 10 shows a curvilinear magnet with a quasi sinusoidally variable thickness magnetized substantially radially for a rotary sensor according to the present invention.

FIG. 10 shows a curvilinear magnet 1 having an angular length of less than 360° and substantially radially magnetized, and the thickness of which varies substantially as a sinusoidal function. The measuring of the magnetic field close to the magnet is performed by a magneto-sensitive element 2. The tangential Bt and axial Bz components of the magnetic flux density on an arc of circle close to the magnet substantially vary as a sine function and a cosine function respectively. A calculation of the arctangent of the Bt/Bz ratio or simply the calculation of the Bt/Bz ratio makes it possible to deduce the angular position of the magnet.

Figure 11:
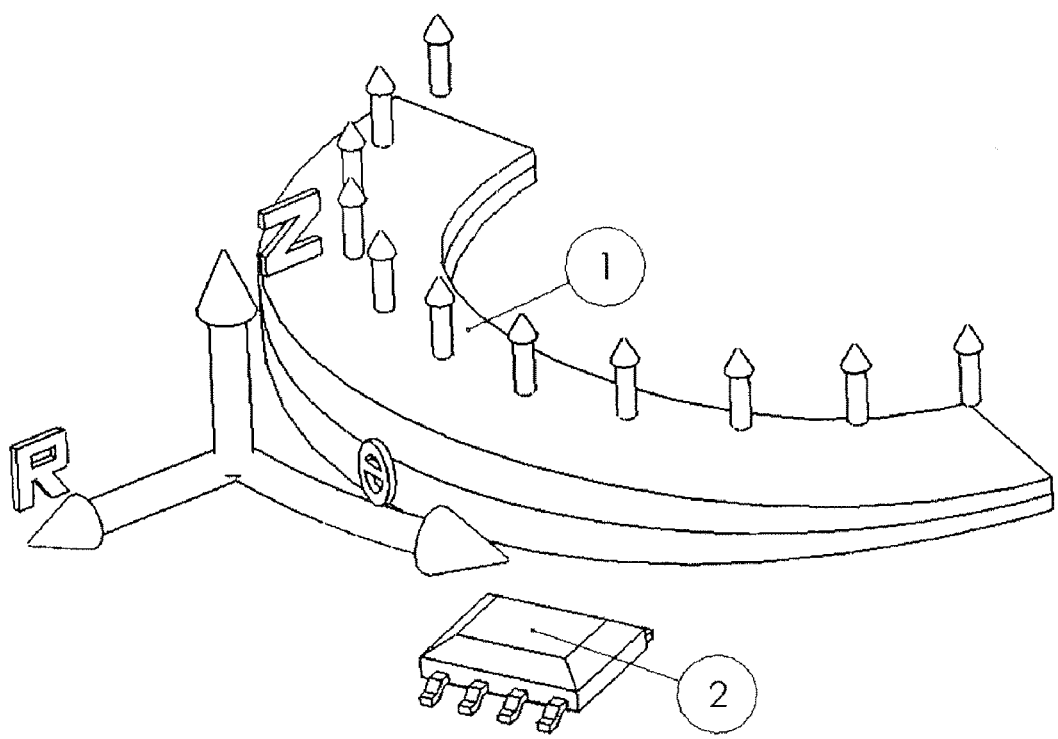
FIG. 11 shows a curvilinear magnet with a quasi sinusoidally variable thickness magnetized substantially along the thickness for a rotary sensor according to the present invention.

FIG. 11 shows a curvilinear magnet 1 having an angular length of less than 360° magnetized substantially along the thickness thereof and the thickness of which varies substantially as a sinusoidal function. Measuring the magnetic field close to the magnet is performed by a magneto-sensitive element 2. The tangential Bt and axial Bz components of the magnetic flux density on an arc of circle close to the magnet substantially vary as a sine function and a cosine function respectively. A calculation of an arctangent of the Bt/Bz ratio or simply the Bt/Bz ratio makes it possible to deduce the angular position of the magnet.

Figure 12:
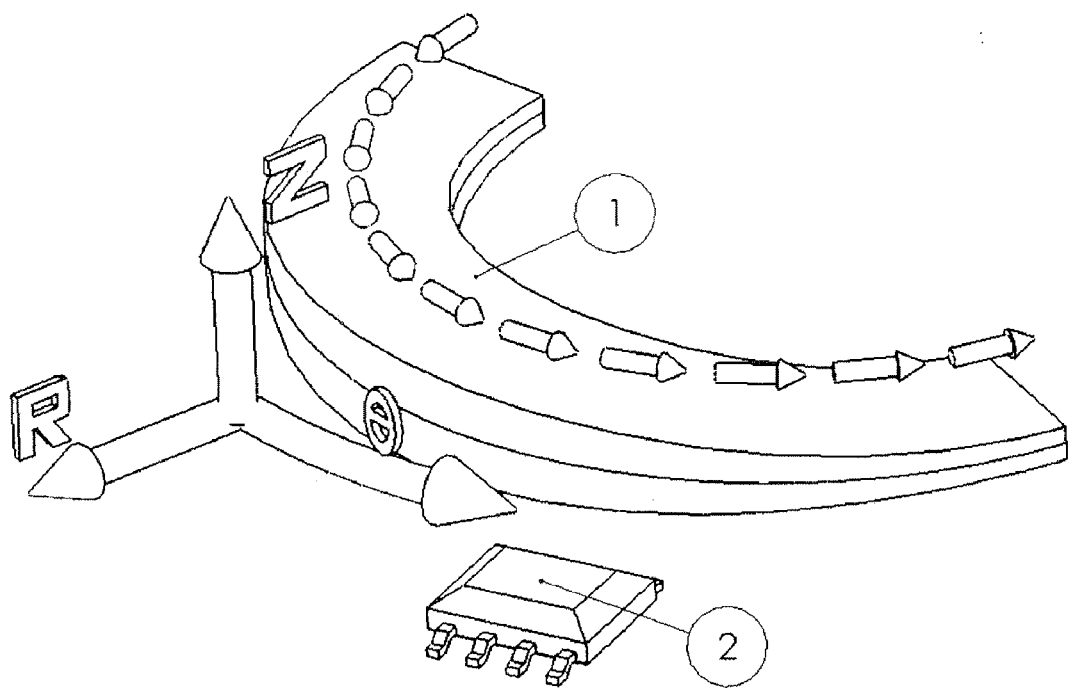
FIG. 12 shows a curvilinear magnet with a quasi sinusoidally variable thickness magnetized according to the thickness for a rotary sensor according to the present invention.

FIG. 12 shows a curvilinear magnet having an angular length of less than 360° substantially magnetized tangentially and the thickness of which substantially varies as a sinusoidal function, the tangential Bt and axial Bz components of the magnetic flux density on an arc of circle around the magnet substantially vary along a sine function and a cosine function respectively. A calculation of an arctangent of the Bt/Bz ratio or simply the Et/Bz ratio makes it possible to deduce the angular position of the magnet.

Figure 13:
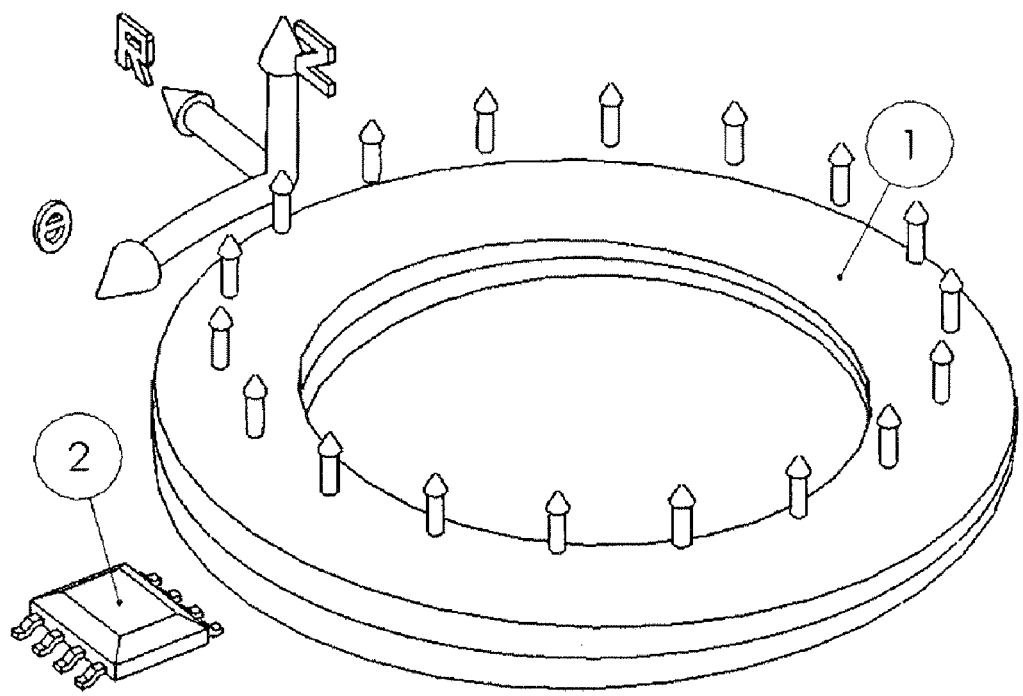
FIG. 13 shows a disk magnet with a thickness varying substantially as a sinusoidal function and magnetized along the thickness thereof.

FIG. 13 shows a disk magnet 1 having a thickness varying as a substantially sinusoidal function and substantially axially magnetized.

Figure 14:
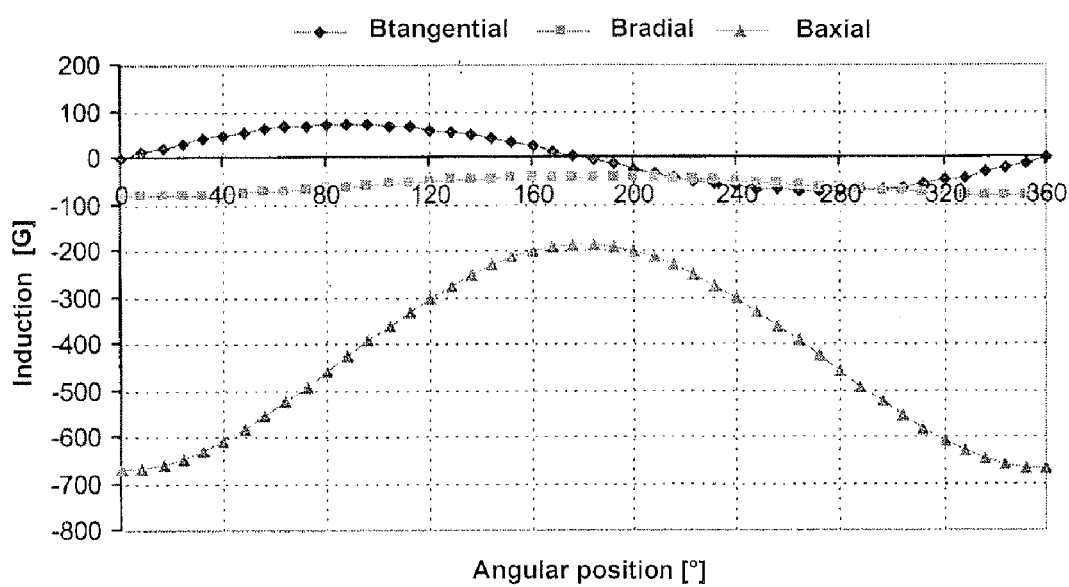
FIG. 14 shows the three components of the magnetic flux density close to the magnet of FIG. 13.

FIG. 14 shows the three components of the magnetic flux density close to the magnet of FIG. 13. The axial Bz and radial Br components are in phase whereas the tangential Bt component is out of phase by 90° with respect to the two other ones. The measuring of two components of the magnetic field is performed by magneto-sensitive element of the ASIC type 2. The calculation of the arctangent of the Bt/Bz ratio or Bt/Br ratio does not work since there is an offset on the axial and radial components; this offset must be compensated for. The difference in amplitude of both components of the ratio must also be compensated for. To deduce the angular position, it is thus necessary to calculate the arctangent of the Gain Bt/(Bz-OffsetBz) ratio.

Figure 15:
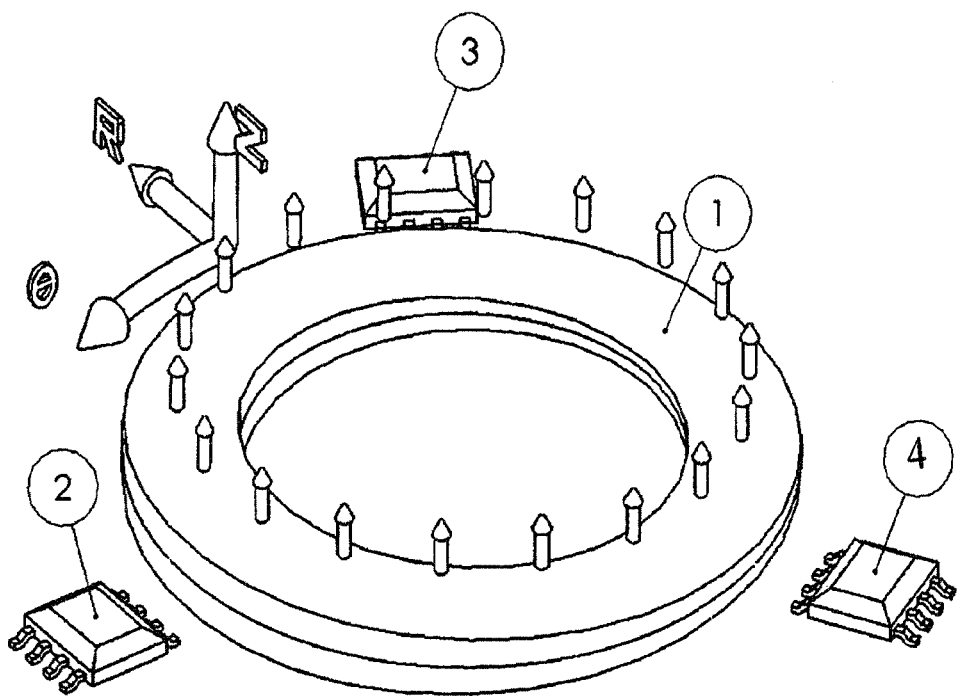
FIG. 15 shows a disk magnet with a thickness varying substantially as a sinusoidal function magnetized substantially axially with three magneto-sensitive elements measuring the same components of the magnetic flux density.

FIG. 15 shows the same configuration of that of FIG. 13, but the calculation of the angular position of the magnet is performed by positioning three probes 2, 3 & 4 shifted by 120° on a circle having a radius R close to the magnet and measuring the same component of the magnetic field B1, B2 and B3. As the components of the magnetic field vary as a substantially sinusoidal function, the angular position of the magnet can then be calculated using the following formulas:

$$B1 = \text{Amplitude} * \text{Cos}(\text{Angle}) + \text{Offset}$$

$$B2 = \text{Amplitude} * \text{Cos}(\text{Angle} + 2\pi/3) + \text{Offset}$$

$$B3 = \text{Amplitude} * \text{Cos}(\text{Angle} + 4\pi/3) + \text{Offset}$$

$$\text{Offset} = 13(B1 + B2 + B3)$$

$$\text{Amplitude} = -\frac{2\sqrt{(B2-B3)^2}\sqrt{B1^2 + B2^2 - B2B3 + B3^2 - B1(B2+B3)}}{3(B2-B3)}$$

$$\text{Angle} = -\text{ArcSec}\left[\frac{2(B2-B3)\sqrt{B1^2 + B2^2 - B2B3 + B3^2 - B1(B2+B3)}}{\sqrt{(B2-B3)^2}(-2B1 + B2 + B3)}\right]$$

The angular distance between the three magneto-sensitive elements have been selected to be equal to 120° in the above example, but other values can also be used and result in other equations. Then it is sufficient to solve the following system:

$$B1 = \text{Amplitude} * \text{Cos}(\text{Angle}) + \text{Offset}$$

$$B2 = \text{Amplitude} * \text{Cos}(\text{Angle} + \Theta_1) + \text{Offset}$$

$$B3 = \text{Amplitude} * \text{Cos}(\text{Angle} + \Theta_2) + \text{Offset}$$

Figure 16:
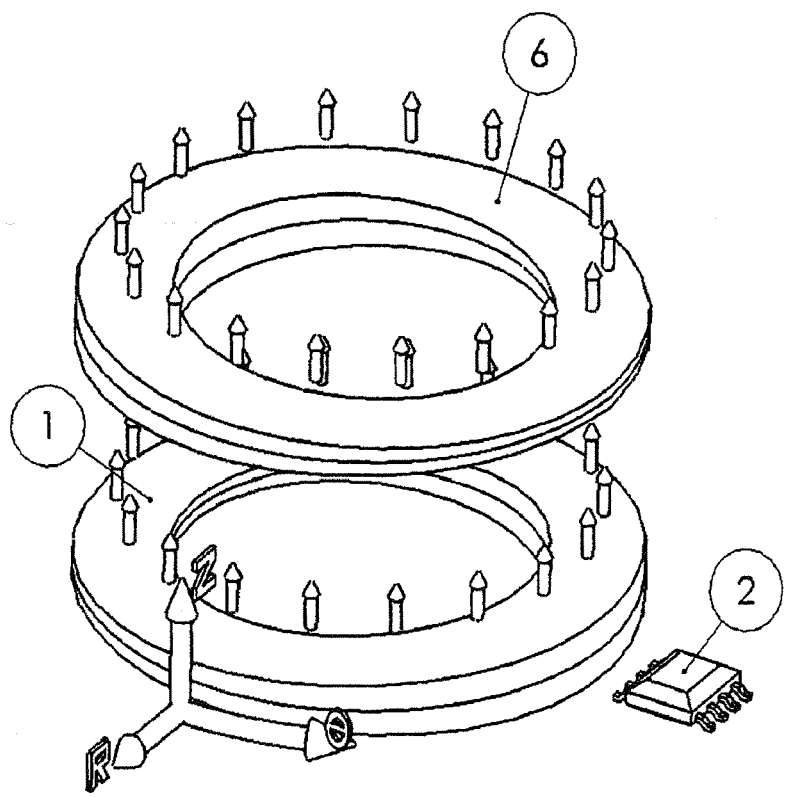
FIG. 16 shows two disk magnets with a thickness varying substantially as a sinusoidal function magnetized substantially axially and a component capable of measuring two components of the magnetic field at a single spot.

FIG. 16 shows two disk magnets 1 and 6 having a thickness varying as a substantially sinusoidal function and magnetized substantially axially in the same direction. Both magnets are coaxial and axially shifted by a certain distance. Both magnets are also angularly shifted by an angle substantially equal to 180°.

Figure 31:
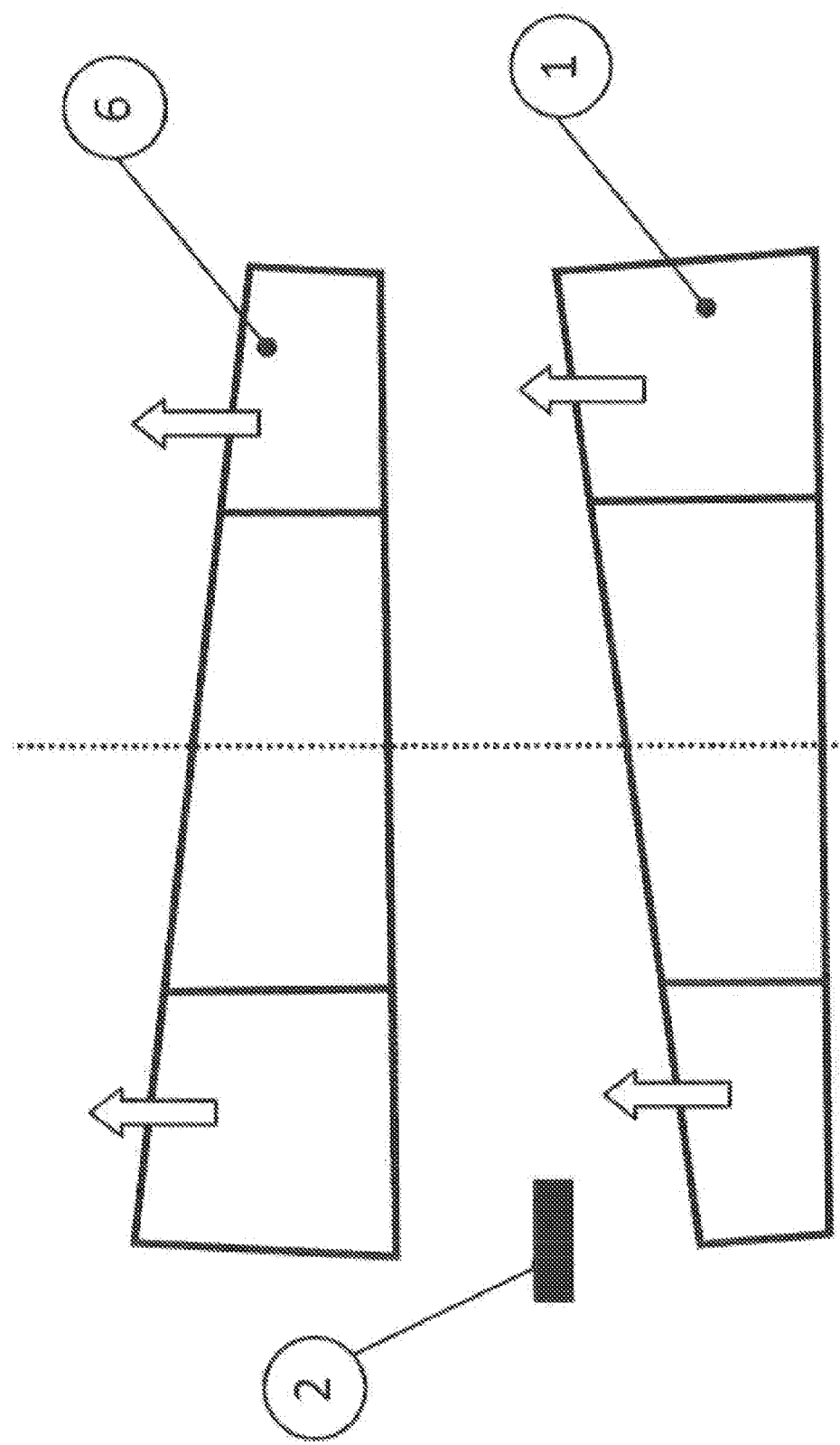
FIG. 31 shows a cross section of two disk magnets with a thickness varying substantially as a sinusoidal function magnetized substantially axially and a component of measuring two components of the magnetic field at a single spot.

FIG. 31 shows a cross section of two disk magnets 1 and 6 having a thickness varying as a substantially sinusoidal function and magnetized substantially axially in the same direction, similar to FIG. 16. Both magnets are axially shifted by a certain distance and are angularly shifted by an angle substantially equal to 180°. Two magneto-sensitive elements may be integrated into the same housing 2 and may be placed in an axial position halfway between the two axially stacked magnets 1, 6.

Figure 17:
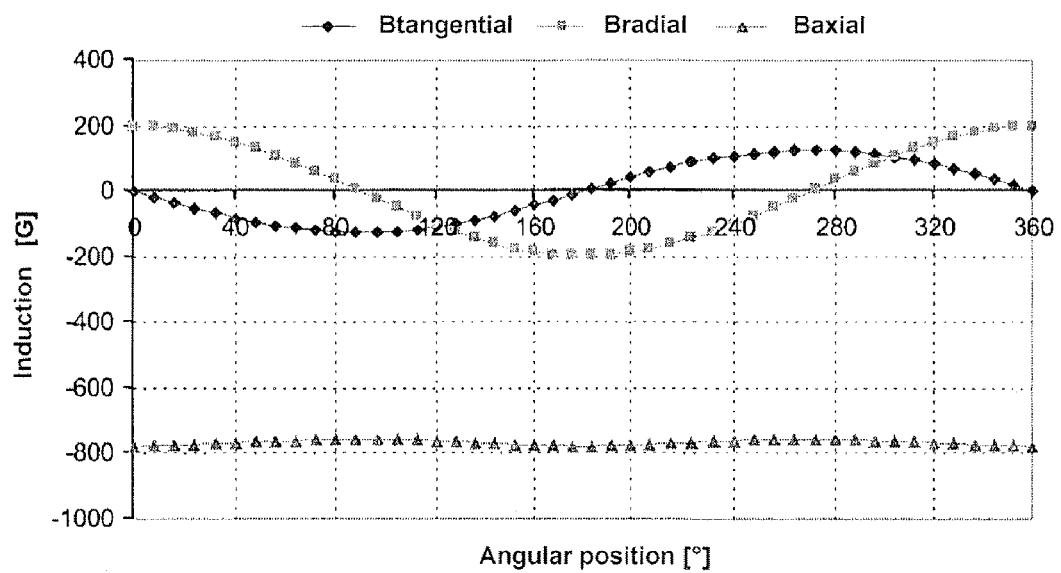
FIG. 17 shows the three components of the magnetic flux density measured close to the magnet of FIG. 16.

FIG. 17 shows the three components of the magnetic flux density between the two magnets. The measuring of the two components of the magnetic flux density between the two magnets is performed by two magneto-sensitive elements which can be incorporated or not in the same housing 2. By stacking the two magnets in this way, it is possible to get rid of the problem of offset on the radial component of the flux density. The tangential Bt and radial Br components are sinusoidal and shifted by a quarter of a period and thus a calculation of the arctangent of the Bt/Br ratio after having applied an amplitude compensation makes it possible to deduce the angular position of the magnet. By adequately selecting the position of the measurement, it is possible to have two components having the same amplitude and thus to get rid of the gain compensation between the two components.

Figure 18:
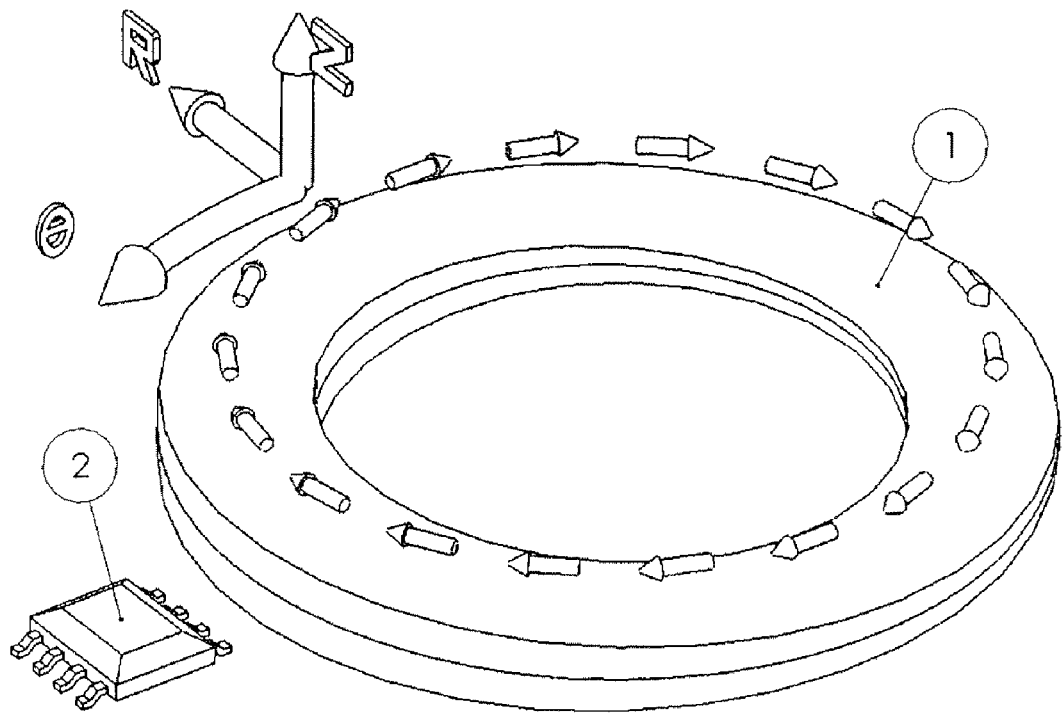
FIG. 18 shows a disk magnet with a thickness substantially varying as a sinusoidal function and magnetized substantially tangentially.

FIG. 18 shows a disk magnet 1 with a thickness varying as a substantially sinusoidal function and substantially tangentially magnetized. The measuring of both components of the magnetic field close to the magnet is performed by two magneto-sensitive elements which are integrated or not in the same housing 2 and which are capable of measuring both components at the same spot. The magneto-sensitive element can integrate the calculation of the ratio of amplitudes and the calculation of the arctangent.

Figure 19:
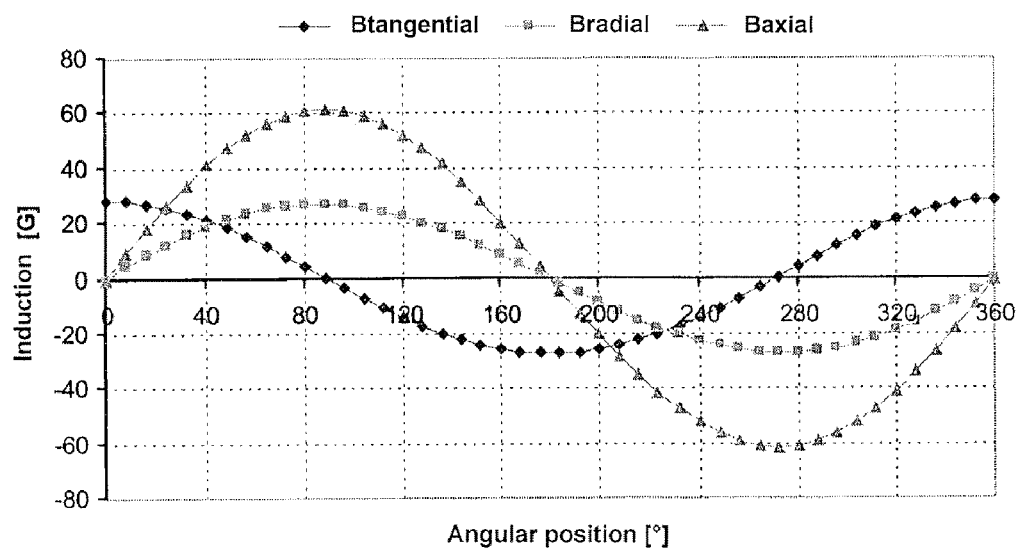
FIG. 19 shows the three components of the magnetic flux density measured close to the magnet of FIG. 18.

FIG. 19 shows the three components of the magnetic flux density measured close to the magnet in FIG. 18. The axial Bz and radial Br components are in phase whereas the tangential component Bt is out of phase by 90° with respect to the two other ones. A calculation of the arctangent of the Bt/Bz ratio or the Bt/Br ratio after applying an amplitude compensation makes it possible to deduce the angular position of the magnet.

Figure 20:
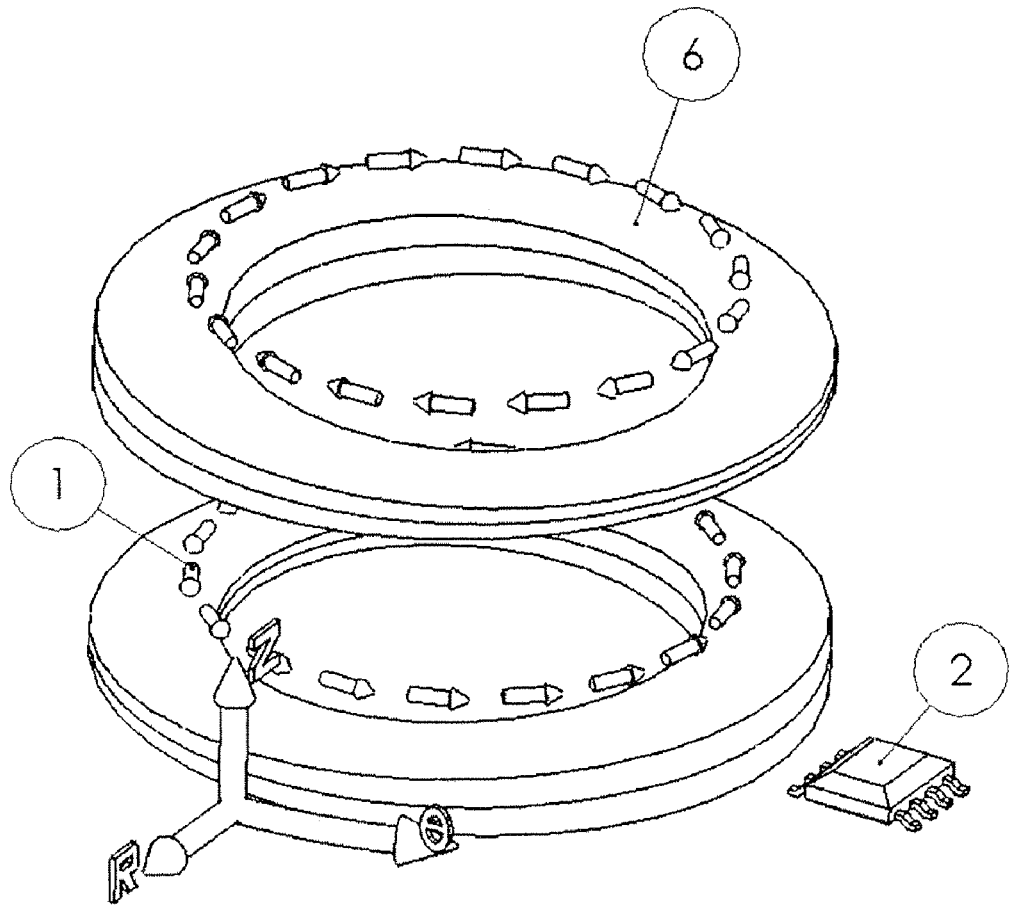
FIG. 20 shows two disk magnets with a thickness substantially varying as a sinusoidal function magnetized substantially tangentially and the component capable of measuring two components of the magnetic field at a single spot.

FIG. 20 shows two disks magnets 1 and 6 where the thickness varying as a substantially sinusoidal function and substantially tangentially magnetized in opposite direction. Both magnets are coaxial and axially shifted by a certain distance. Both magnets are also angularly shifted by an angle substantially equal to 180°. The measuring of both components of the magnetic field between the two magnets is performed by two magneto-sensitive elements 2 which are integrated or not in the same housing. By stacking both magnets in this way, it is possible to get rid of the offset problem on the radial component of the flux density.

Figure 21:
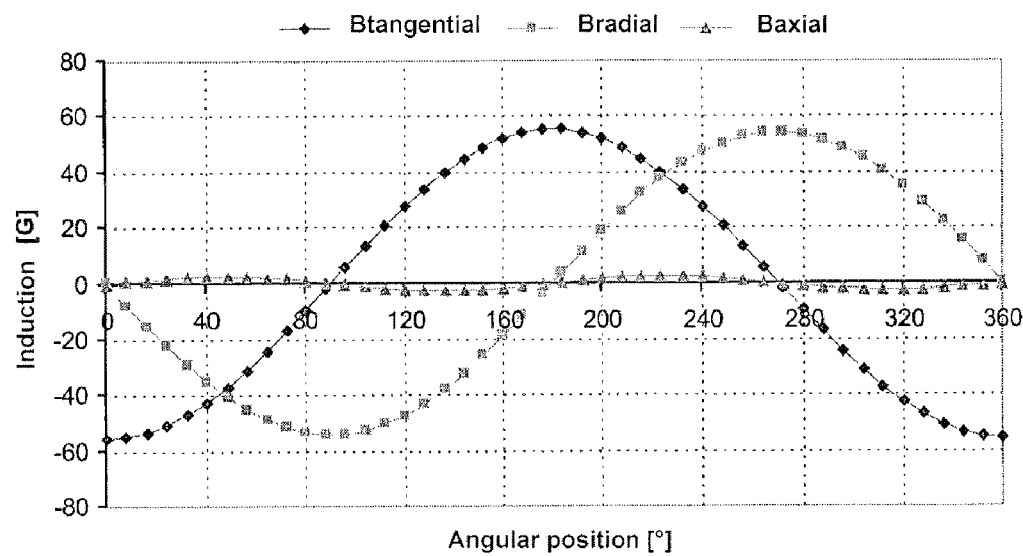
FIG. 21 shows the three components of the magnetic flux density measured close to the magnet of FIG. 20.

FIG. 21 shows the three components of the magnetic flux density between the two magnets in FIG. 20. The tangential Bt and radial Br components are sinusoidal and out of phase by a quarter of a period and thus the calculation of the arctangent of the Bt/Br ratio after applying an amplitude compensation makes it possible to deduce the angular position of the magnet. As a matter of fact, the amplitude of the components of the magnetic flux density are different and thus, in order for the decoding of the angle using 2 components of the magnetic flux density varying sinusoidally but out of phase by 90° to work, it is necessary to have identical amplitudes on the two signals. By appropriately selecting the measuring position, it is possible to have both components with the same amplitude and thus to get rid of the gain compensation between the two components.

Figure 22:
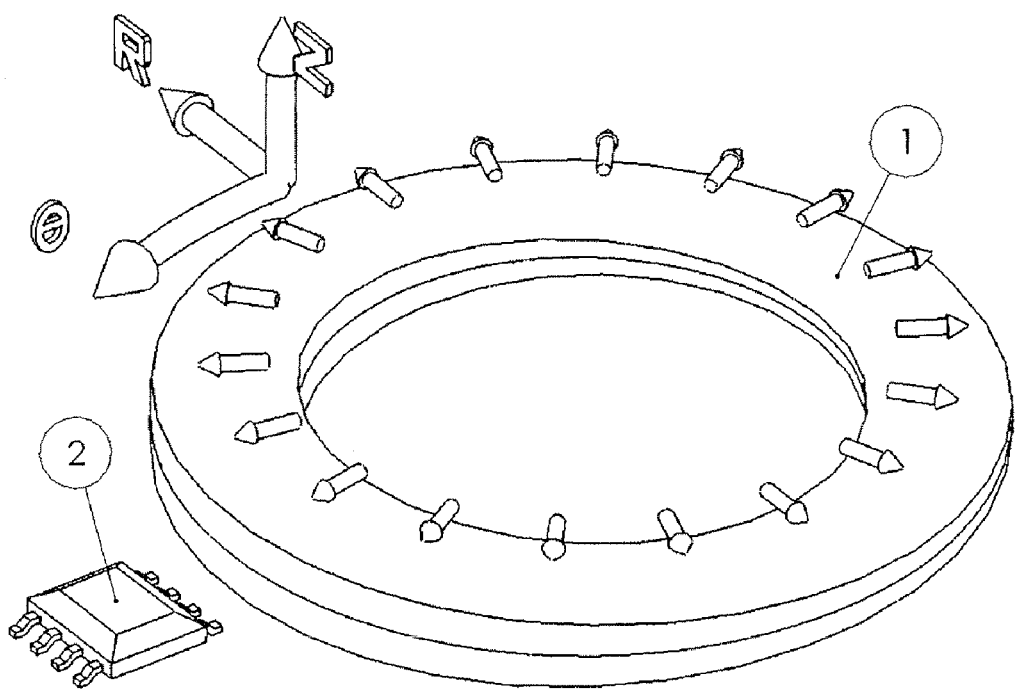
FIG. 22 shows a disk magnet with a thickness varying substantially as a sinusoidal function and magnetized substantially radially.

FIG. 22 shows a disk magnet 1 with a thickness varying as a substantially sinusoidal function and radially magnetized. The measuring of both components of the magnetic flux density at the same spot close to the magnet is performed by two magneto-sensitive elements integrated in the same housing 2.

Figure 23:
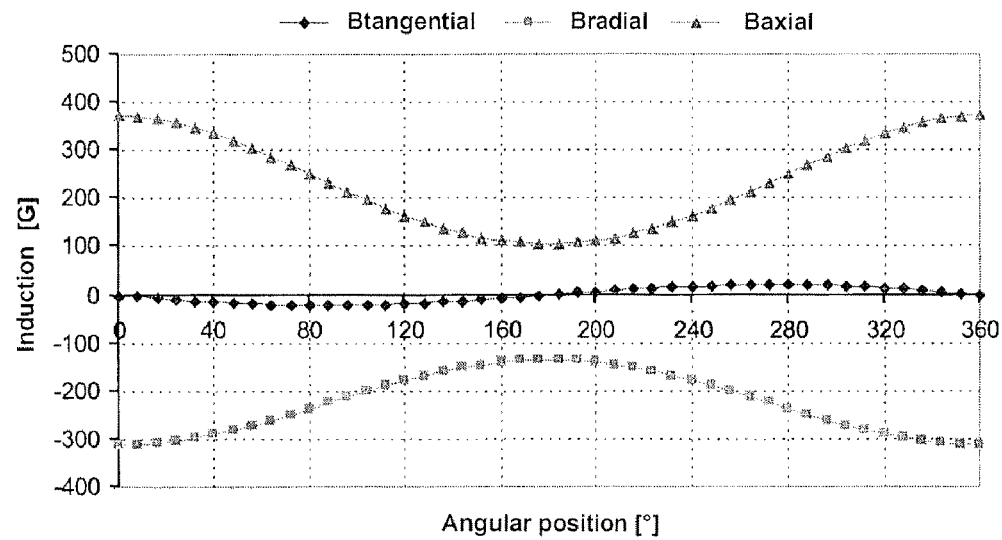
FIG. 23 shows the three components of the magnetic flux density measured close to the magnet of FIG. 22.

FIG. 23 shows the three components of the magnetic flux density measured at the same spot. The axial Bz and radial Br components are in phase whereas the tangential Bt component is out of phase by 90° with respect to the two other ones. The amplitudes of the three components are different and to be able to decode the angle, it is necessary to standardize the amplitudes by applying a multiplying factor GAIN between the two components prior to calculating the arctangent. A calculation of the arctangent of the Bt/Bz ratio or Bt/Br ratio does not work since there is an offset on the axial and radial components. To be able to deduce the angular position, it is necessary to calculate the arctangent of the GAIN Bt/(Bz−OffsetBz) ratio.

Figure 24:
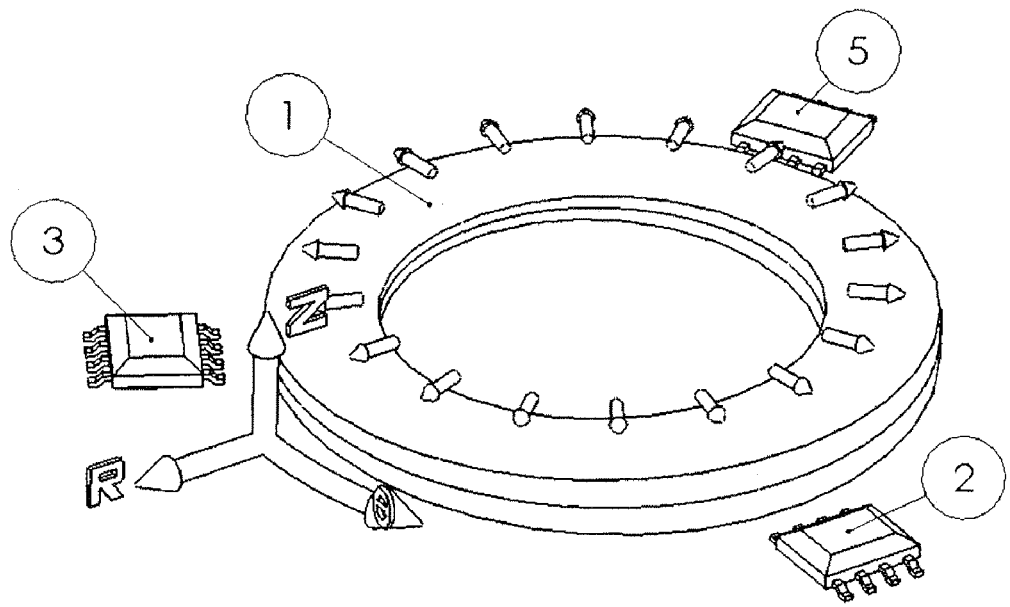
FIG. 24 shows a disk magnet with a thickness varying substantially as a sinusoidal function magnetized substantially radially with three magneto-sensitive elements measuring the same component of the magnetic flux density.

FIG. 24 shows a configuration equivalent to the configuration of FIG. 22 but the measuring of the magnetic flux density is performed by positioning three probes 2, 3 and 5 shifted by 120° on a circle having a radius R close to the magnet and by measuring the same component to the magnetic field B1, B2 and B3 calculating the angular position of the magnet using the following formula:

$$B1 = \text{Amplitude} * \text{Cos}(\text{Angle}) + \text{Offset}$$

$$B2 = \text{Amplitude} * \text{Cos}(\text{Angle} + 2\pi/3) + \text{Offset}$$

$$B3 = \text{Amplitude} * \text{Cos}(\text{Angle} + 4\pi/3) + \text{Offset}$$

$$\text{Offset} = 13(B1 + B2 + B3)$$

$$\text{Amplitude} = -\frac{2\sqrt{(B2-B3)^2}\sqrt{B1^2 + B2^2 - B2B3 + B3^2 - B1(B2+B3)}}{3(B2-B3)}$$

$$\text{Angle} = -\text{ArcSec}\left[\frac{2(B2-B3)\sqrt{B1^2 + B2^2 - B2B3 + B3^2 - B1(B2+B3)}}{\sqrt{(B2-B3)^2}(-2B1 + B2 + B3)}\right]$$

Figure 25:
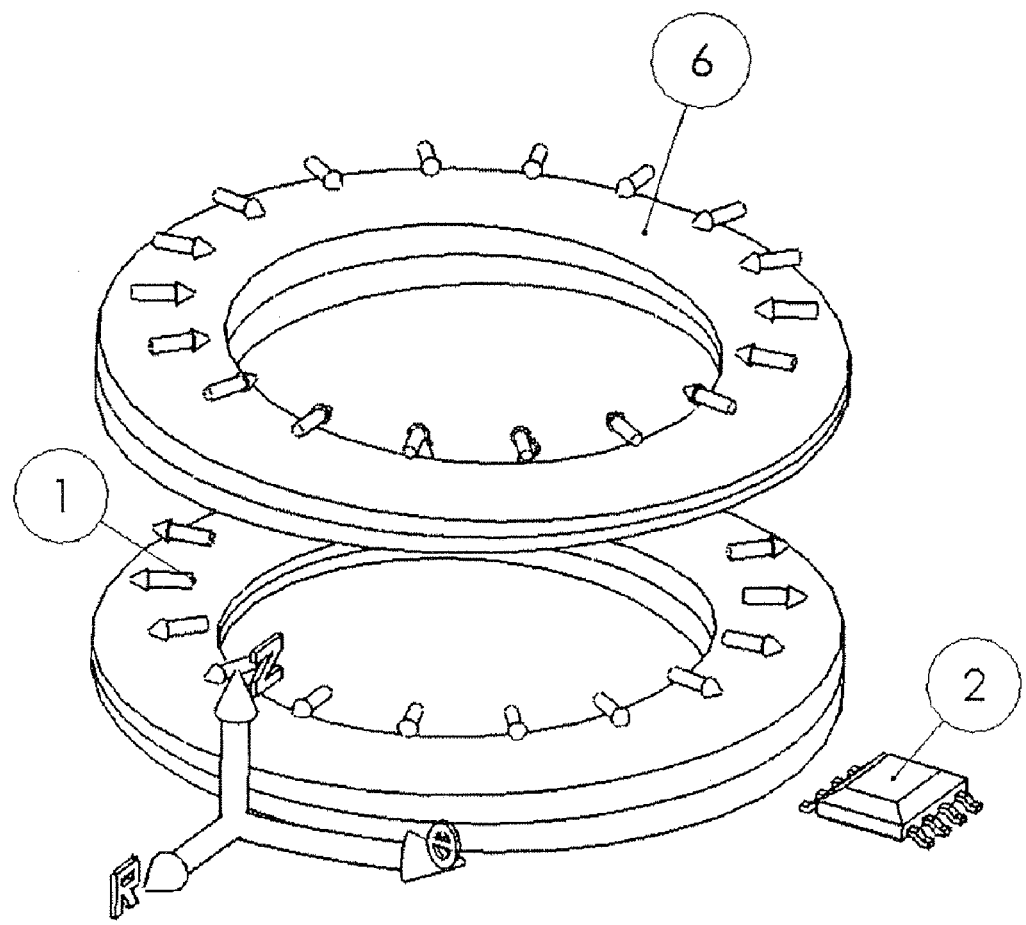
FIG. 25 shows two disks magnets with a thickness varying substantially as a sinusoidal function magnetized substantially radially and a component capable of measuring two components of the magnetic field at a single spot.

FIG. 25 shows two different magnets 1 and 6 with a thickness varying as a substantially sinusoidal function and magnetized substantially radially in the opposite direction. Both magnets are coaxial and axially shifted by a certain distance. These two magnets are also angularly shifted by an angle substantially equal to 180°. The measuring of both components of the magnetic field flux density between the two magnets is performed by two magneto-sensitive elements integrated or not in the same housing 2. By stacking both magnets in this way, it is possible to get rid of the problem of offset on the radial component of the flux density.

Figure 26:
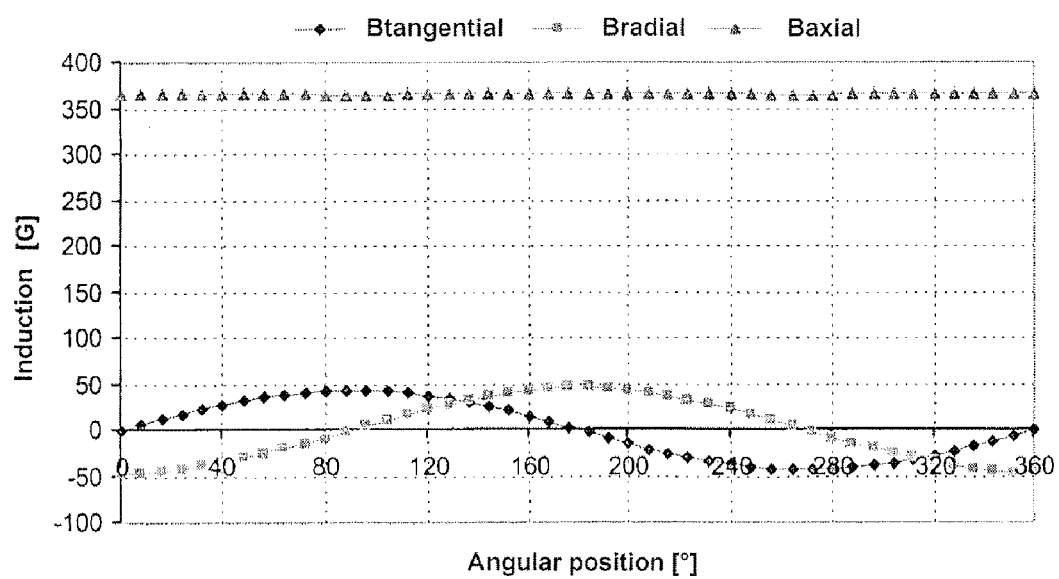
FIG. 26 shows the three components of the magnetic flux density measured close to the magnet of FIG. 25.

FIG. 26 shows the three components of the magnetic flux density measured at the same spot between the two magnets. The tangential Bt and radial Br components are sinusoidal and out of phase by a quarter of a period thus the calculation of the arctangent of the Bt/Br ratio after applying an amplitude compensation makes it possible to deduce the angular position of the magnet. By selecting appropriately the position of the measurement, it is possible to have two components having the same amplitude and thus to get rid of the gain compensation between the two components.

Figure 27:
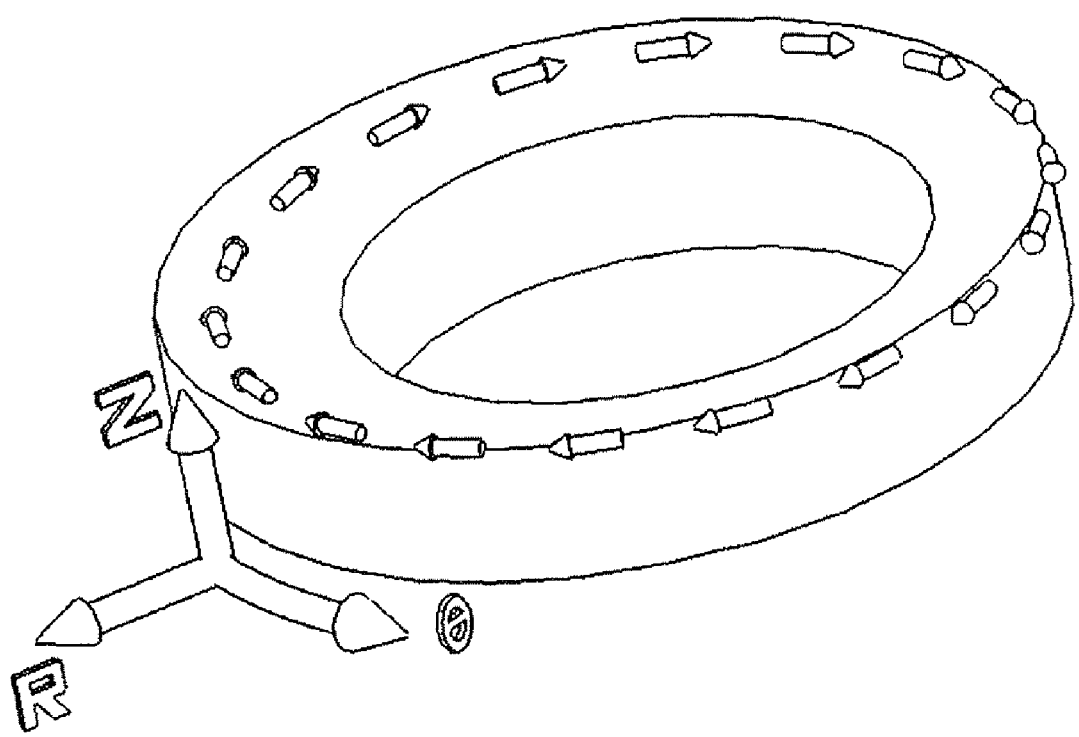
FIG. 27 shows a disk magnet with a radial width varying substantially as a sinusoidal function magnetized substantially tangentially.

FIG. 27 shows a disk magnet with a radial thickness varying as a substantially sinusoidal function and magnetized substantially tangentially. In such a configuration, it is possible to find a measuring spot where two of the magnetic field components vary as a sine function and a cosine function. A calculation of the arctangent of the ratio of these 2 components with or without a gain compensation makes it possible to deduce the angular position of the magnet. Preferably, in such a configuration, the tangential and radial components of the flux density will be used with a measuring spot on the symmetric plan of the magnet, but other configurations are also possible.

Figure 28:
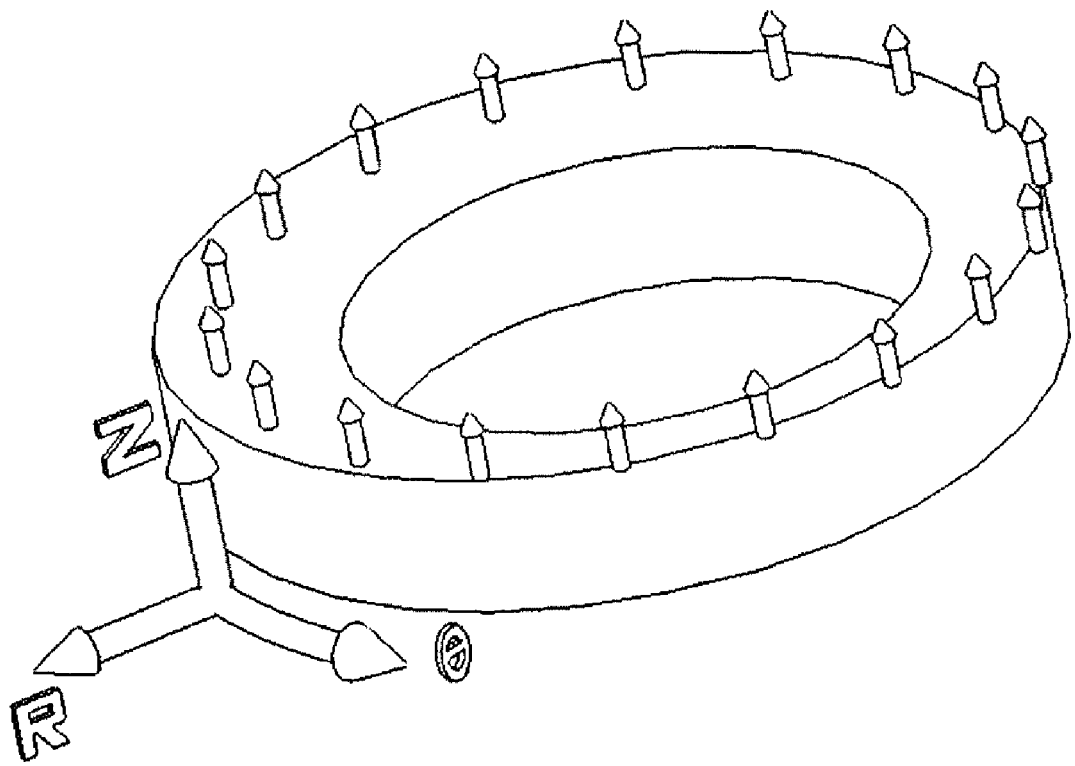
FIG. 28 shows a disk magnet with a radial width varying substantially as a sinusoidal function magnetized substantially axially.

FIG. 28 shows a disk magnet with a radial thickness varying as a substantially sinusoidal function and magnetized substantially axially. For this configuration, measuring the tangential component of the magnetic field close to the magnet as well as measuring the radial component of the axial component or a combination of these two components makes it possible, with a calculation of the arctangent of the ratio of the two components after subtracting the offset, if any, to obtain the angular position of the magnet.

Figure 29:
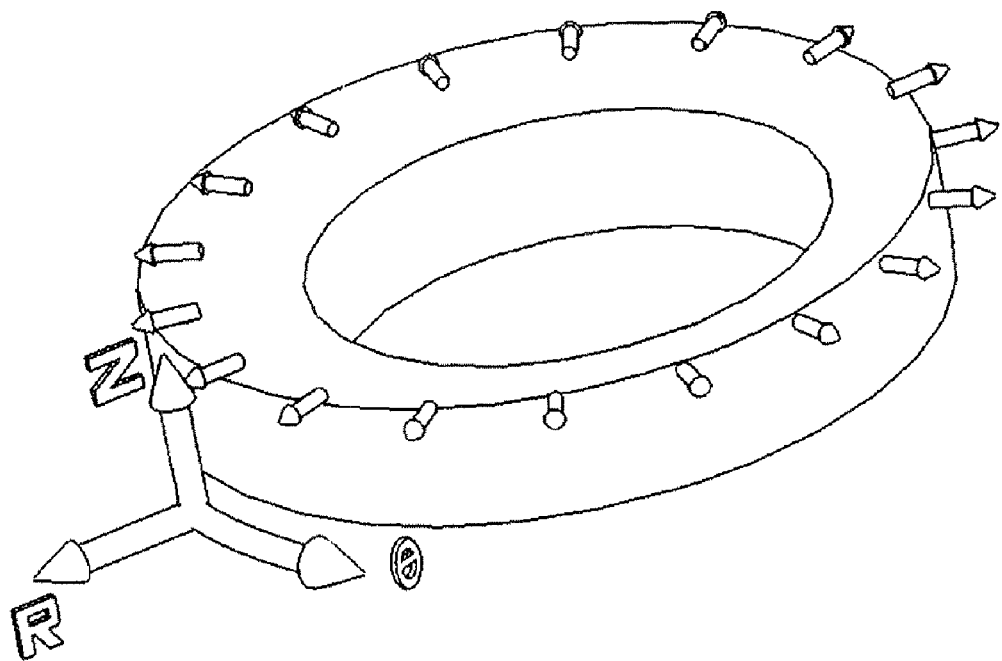
FIG. 29 shows a disk magnet with a radial width varying substantially according to a sinusoidal function magnetized substantially radially.

FIG. 29 shows a disk magnet with a radial thickness varying as a substantially sinusoidal function and magnetized substantially radially. For this configuration, measuring the tangential component of the magnetic field close to the magnet as well as measuring the radial component or the axial component or the combination of these two components makes it possible, by calculating the arctangent of the ratio of the two components after subtracting the offset, if any, to obtain the angular position of the magnet.

Figure 30:
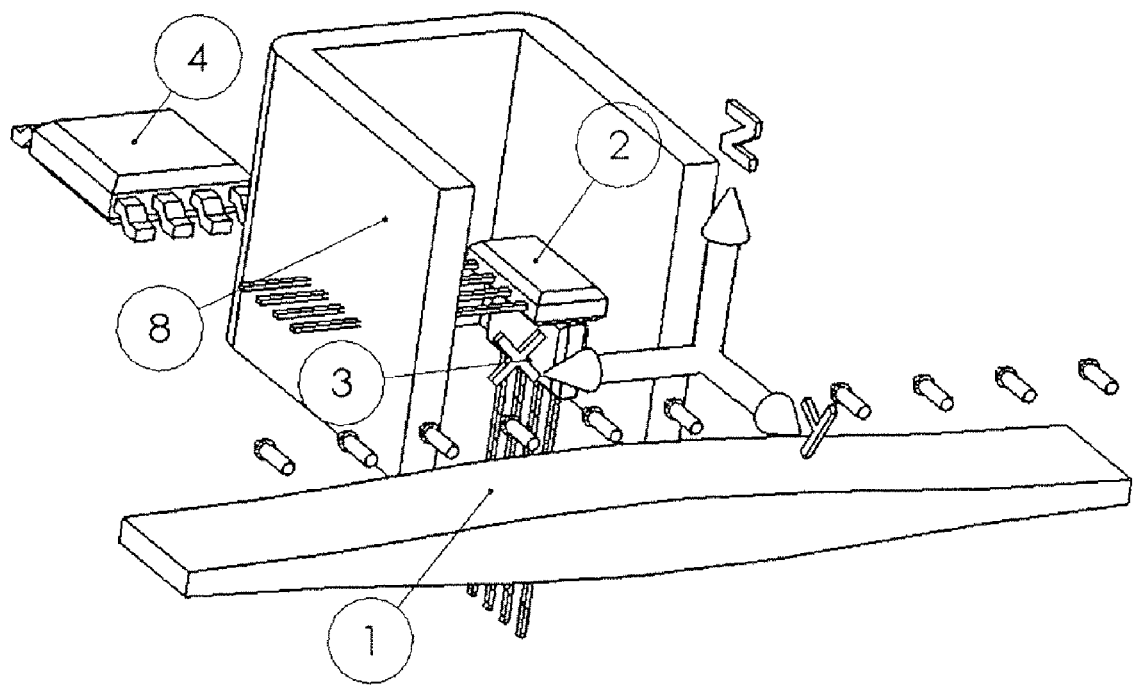
FIG. 30 shows a position sensor according to the present invention with an outer magnetic field armoring device.

FIG. 30 shows a linear position sensor according to the present invention with a magnet 1 having a thickness varying substantially as a sinusoidal function and an outer magnetic field armoring system 8 in the measuring plane of the magneto-sensitive element or elements. This armoring is made of a ferromagnetic material making it possible to reduce or cancel the influence of the magnetic field source positioned close to the position sensor.

The invention claimed is:
1. A magnetic angular or linear position sensor including:
   at least one permanent magnet defined in a cylindrical (r, Q & z) or Cartesian (x, y & z) coordinate system and
   at least two magneto-sensitive elements, wherein the magnet moves in relation to said two magneto-sensitive elements,
   wherein the at least one magnet has at least a dimension which varies as a non constant function and in that the magnetization of said at least one magnet is oriented in a single direction x, y or z in the case of a magnet defined in a Cartesian coordinate system or r, Q or z in the case of a magnet defined in a cylindrical coordinate system, and wherein the at least two magneto-sensitive elements measure a magnetic flux angle, the magnetic flux angle being the angular direction of the magnetic flux.
2. A magnetic angular or linear position sensor according to claim 1, characterised in that said dimension varies according to a non constant and continuous law.

3. A magnetic angular or linear position sensor according to claim 2, characterised in that said dimension varies according to a non constant and periodical law.

4. An angular or linear magnetic position sensor according to claim 3, characterised in that at least one of the dimensions of said at least one magnet varies substantially as a sinusoidal function.

5. A magnetic linear or angular position sensor according to claim 1, characterised in that the magneto-sensitive elements measure two components of the magnetic field substantially at the same spot.

6. A magnetic linear or angular position sensor according claim 1, characterised in that a calculation of the position is made by calculating a ratio of two components of the magnetic field or by calculating an arctangent of the same ratio.

7. A magnetic linear or angular position sensor according to claim 1, characterised in that a calculation of the position is made by calculating the arctangent of a ratio of two components of the magnetic field after having applied a multiplying coefficient to the ratio of the two components of the magnetic field considered.

8. A magnetic linear or angular position sensor according to claim 6 characterised in that at least one of the calculation of the ratio of the two components in the magnetic field and the calculation of the arctangent of this ratio is made by a dedicated electronic component.

9. A magnetic linear or angular position sensor according to claim 6, characterised in that at least one of the calculation of the ratio of the two components of the magnetic field and the calculation of the arctangent of this ratio is integrated with the magneto-sensitive elements in a single component.

10. A magnetic linear or angular position sensor according claim 1, characterised in that the at least one permanent magnet is magnetized according to the width thereof, the width being oriented in the direction y of a magnet defined in a Cartesian coordinate system or in the direction r of a magnet defined in a cylindrical coordinates system.

11. A magnetic linear or angular position sensor according to claim 1, characterised in that the at least one permanent magnet is magnetized according to the thickness thereof, the thickness being oriented in the direction z of a magnet defined in a Cartesian coordinate system or in the direction z of a magnet defined in a cylindrical coordinates system.

12. A magnetic linear or angular position sensor according to claim 1, characterised in that the at least one permanent magnet is magnetized according to the length thereof, the length being oriented in the direction x of a magnet defined in a Cartesian coordinate system or in the direction Q of a magnet defined in a cylindrical coordinates system.

13. A magnetic linear or angular position sensor according to claim 1, characterised in that the at least one magnet is at least one of mounted and embedded on a ferromagnetic yoke.

14. An angular position sensor for a travel of less than 360° according to claim 1,
characterised in that the at least one magnet is magnetized according to the thickness thereof, and in that a calculation of the position is obtained by measuring substantially at the same spot of the tangential Bt and, radial Br or axial Bz components and by an arctangent(GAIN Bt/Br−Offset)), wherein Offset is the offset on the radial component Br, or arctangent(GAIN Bt/Bz−Offset)) calculation, wherein Offset is the offset on the axial component Bz.

15. An angular position sensor for a travel of less than 360° according to claim 1,
characterised in that the at least one magnet is magnetized according to the thickness thereof, the thickness being oriented in the direction x of a magnet defined in a Cartesian coordinate system or in the direction Q of a magnet defined in a cylindrical coordinates system, or radially or tangentially, and in that a calculation of the position is obtained by measuring the same tangential Bt, or radial Br, or axial Bz component, at three spots offset by $\theta_1$ and $\theta_2$ and by calculating the angular position obtained by the resolution of the equation system:

$B1 = \text{Amplitude}*\text{Cos}(\text{Angle})+\text{Offset}$ $B2 = \text{Amplitude}*\text{Cos}(\text{Angle}+\theta_1)+\text{Offset}$ $B3 = \text{Amplitude}*\text{Cos}(\text{Angle}+\theta_2)+\text{Offset}.$ 16. An angular position sensor for a travel of less than 360° according to claim 1, characterised in that two magneto-sensitive elements measure two components of the magnetic flux density substantially at the same spot located halfway between two magnets axially stacked and having a thickness substantially varying as a sinusoidal function.

17. An angular position sensor for a travel close to 360° according to claim 16, characterised in that the two magnets are angularly shifted with respect to each another.

18. A magnetic position sensor according to claim 1, characterised in that the magnetic position sensor incorporates an outer magnetic field armoring device comprising a ferromagnetic material positioned close to the position sensor.

19. A magnetic position sensor according to claim 1, wherein the at least two magneto-sensitive elements are located at the same point relative to at least one direction of the coordinate system.

* * * * *